Oct. 18, 1960

P. H. FLINCHBAUGH ET AL 2,956,387

HAY TEDDERS

Filed Nov. 7, 1958

INVENTORS
Paul H. Flinchbaugh
and James H. Kercher

BY Chas. R. Allen

ATTORNEY

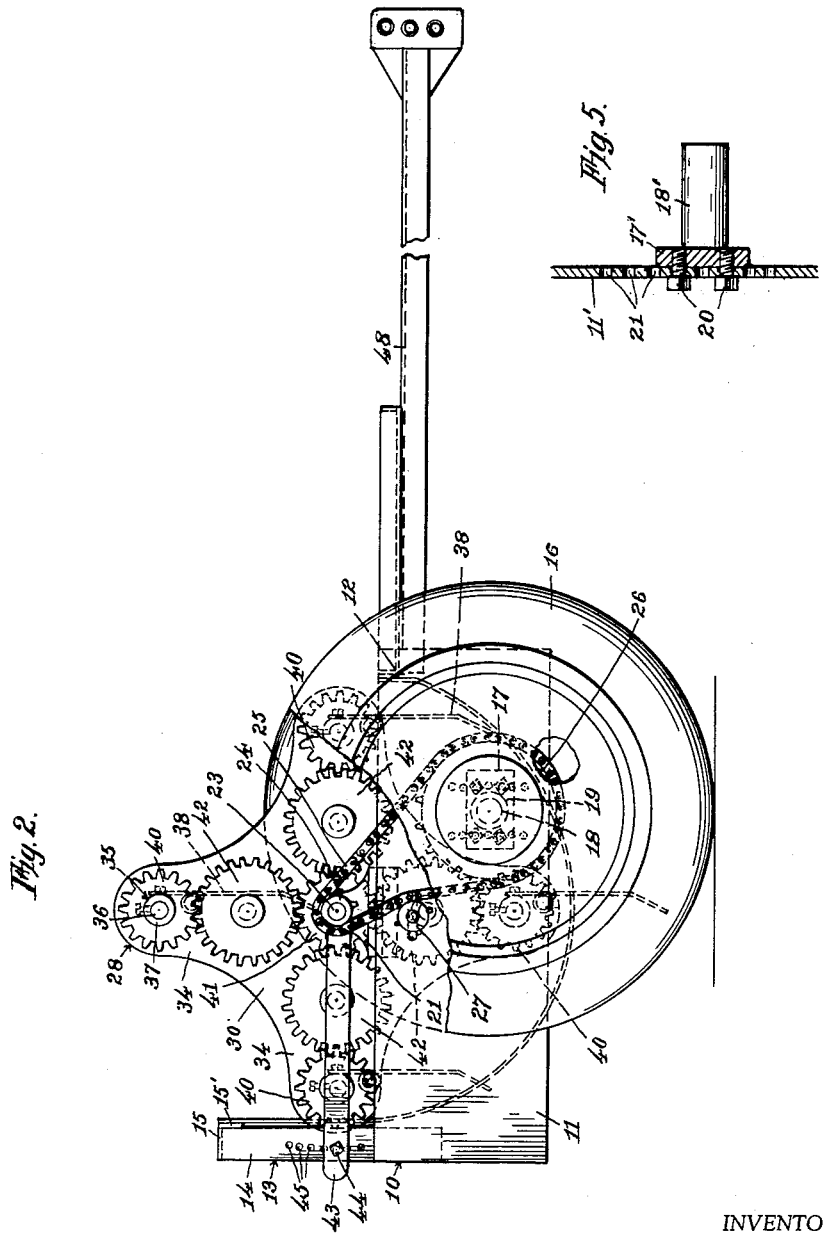

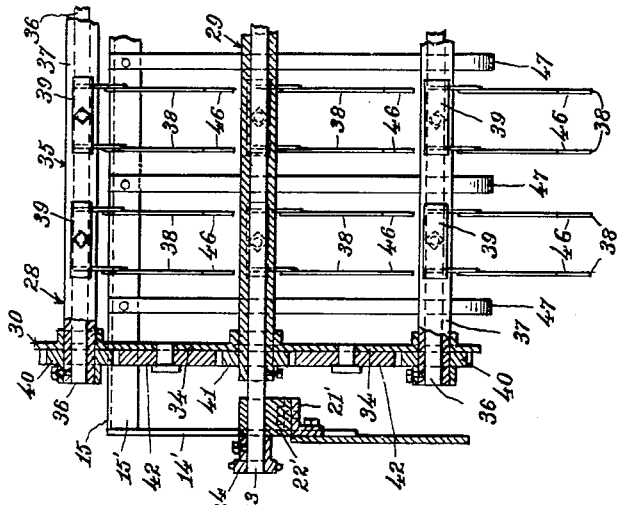
Oct. 18, 1960     P. H. FLINCHBAUGH ET AL     2,956,387
HAY TEDDERS
Filed Nov. 7, 1958     3 Sheets-Sheet 3
INVENTORS
*Paul H. Flinchbaugh*
*and James H. Kercher*
BY
ATTORNEY

United States Patent Office 2,956,387
Patented Oct. 18, 1960

2,956,387

HAY TEDDERS

Paul H. Flinchbaugh, Rte. 3, and James H. Kercher, 407 Sand Hill, both of Lebanon, Pa.

Filed Nov. 7, 1958, Ser. No. 772,599

3 Claims. (Cl. 56—372)

This invention relates to tedders for lifting and fluffing mown hay in order to facilitate and expedite the drying of same.

The object of the invention is to provide an improved tedder, by means of which mown hay may be lifted, fluffed, and returned to rest in fluffed condition on the stubble for quicker drying, particularly after the hay has become damp or wet after mowing.

A further object of the invention is to provide a tedder as stated, equipped with means whereby the hay will not accumulate or become entangled in or about any operative portion of the device.

A further object of the invention is to provide, in a tedder having a fluffer reel provided with a plurality of depending combs, means for simultaneously adjusting the angularity of the teeth of the several combs with the grooves, and for maintaining said teeth in adjusted position as the reel rotates.

A further object of the invention is to provide in a tedder mounted upon wheels, means whereby the same may be readily adjusted vertically to the ground.

A further object of the invention is to provide an improved tedder whereby the fluffer reel extends outwardly behind the wheels of the tedder preventing the compression of the fluffed hay by the subsequent action of the tedder in the adjacent row.

Other objects will appear hereinafter.

The invention will be more readily understood by reference to the accompanying drawings, in which:

Fig. 2 is a side elevation of same upon an enlarged scale, a portion of the adjacent supporting wheel being broken away;

Fig. 3 is a section on substantially the line 3—3 of Fig. 1, illustrated upon the same scale as Fig. 2;

Fig. 4 is a vertical sectional view of the drive end of the reel and adjacent parts of the frame, taken on substantially the line 4—4 of Fig. 3;

Fig. 5 is an enlarged view of a detail section on the line 5—5 of Fig. 3, illustrating the means for adjusting the height of the fluffer combs from the ground.

Figure 1:
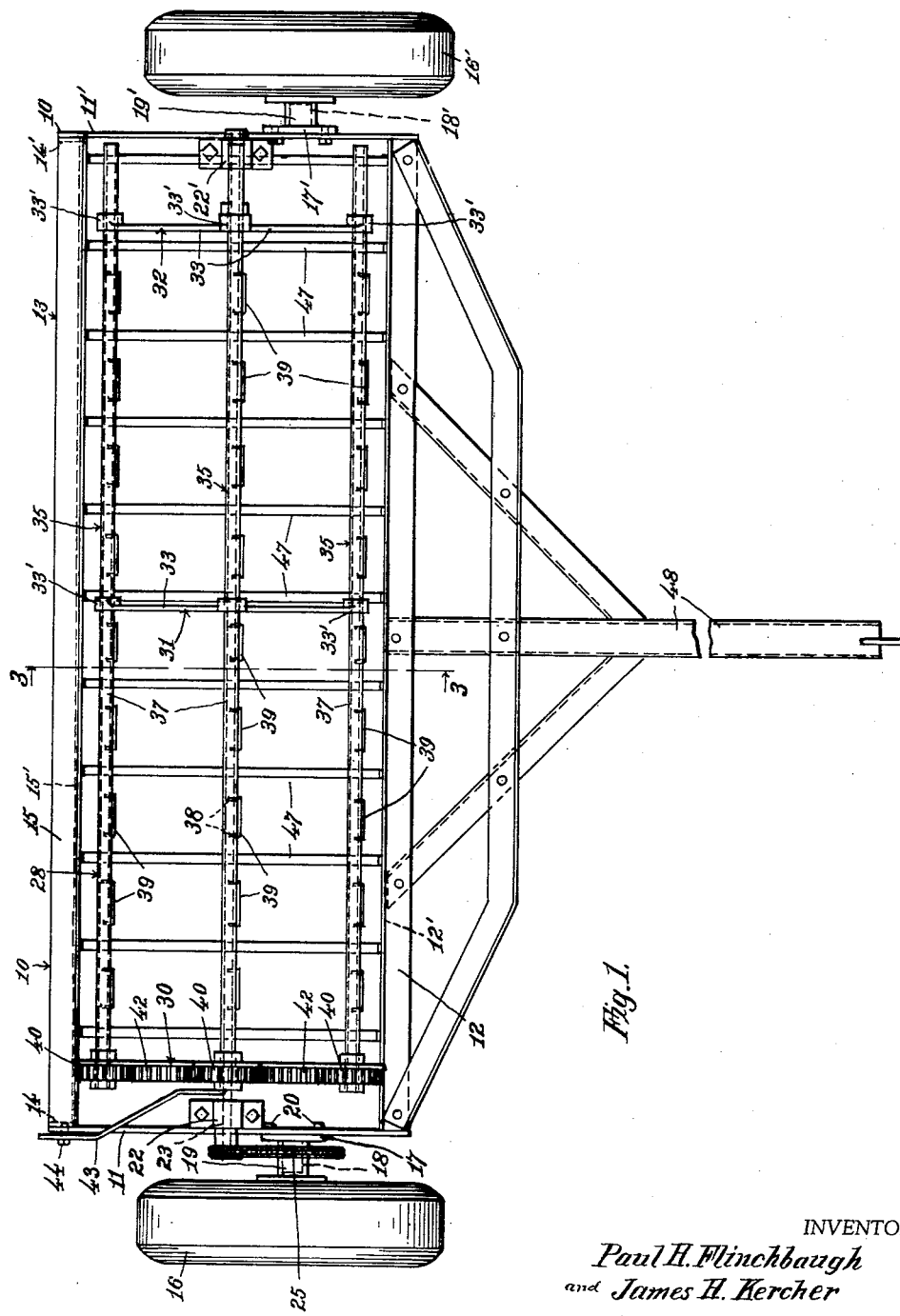
Fig. 1 is a plan view of a tedder embodying the invention.

Referring to the drawings, 10 indicates generally the body or frame of the device, said frame comprising a pair of vertically disposed side plates 11—11' connected at the forward upper portions thereof by a transverse member 12; and at the rear portion with a transversely arched structure 13 consisting of upwardly extending members 14—14' rigidly secured at their lower ends to the side plates 11—11' respectively, and a horizontal transverse member 15 rigidly connecting the upper ends of said members 14—14'. The forward transverse member 12 preferably consists of an angle-iron with the inner flange 12' thereof arranged substantially vertical; and the member 15 comprises an angle-iron with the forward or inner flange 15' thereof substantially vertical for a purpose hereinafter described.

The frame 10 is mounted upon a pair of wheels 16—16' which are adjustably attached to the side plates 11—11' respectively, to provide means for raising and lowering the device as found desirable in order to bring the tedding teeth, hereinafter described, into position for maximum efficiency. To this end, plates 17—17' having spindles 18—18' for the hubs 19—19' of the wheels 16—16', are adjustably attached against the outer faces of the frame side plates 11 and 11' by bolts 20. Said bolts extend outwardly through holes 20' provided in vertical series in plate 11—11' as illustrated in Fig. 3; and are readily manipulated from the inside of plates 17—17' to adjust the height of the device from the ground.

Fixed to the inner sides of plates 11—11', at or adjacent the upper edges thereof, are brackets 21—21' which support bearing blocks 22—22' respectively for a drive shaft 23 upon which a fluffer reel 28 is mounted. One end of the shaft 23 projects outwardly beyond the side plate 11, and is provided on said end with a sprocket wheel 24 which is connected by a sprocket chain 25 with a sprocket 26 fixed to the hub of wheel 16, whereby forward movement of the device will impart rotary motion to the shaft 23 and at a greater speed than that of wheel 16. An idler wheel 27 is adjustably mounted on the side frame member 11 by mounting means not shown, whereby proper tension on the chain may be had irrespective of the adjusted position of the wheels 16—16' relative to the frame.

The fluffing reel 28 is mounted on the transverse drive shaft 23, and comprises a tubular shaft 29 through which the drive shaft 23 extends and to which it is secured, a drive plate 30 fixed to said shaft 29, adjacent one end thereof, and spiders 31 and 32; one of said spiders, 32, being adjacent the end of the shaft remote from the tubular shaft 29, and the spider 31 being positioned on the shaft substantially midway between the spider 32 and plate 30. Each of the spiders 31 and 32 are formed with radial arms 33, preferably four, and the drive plate 30 includes a corresponding number of radial portions 34.

Rotatably mounted in said arms 33 of the spiders 31 and 32, and in the radial portions 34 of the drive plate 30, and adjacent the outer ends thereof, are comb shafts 35, each consisting of an inner rod 36 and a tubular sleeve portion 37, and to each of which comb shafts are secured a plurality of depending hay fluffing teeth 38; said teeth preferably being spaced at equal distances apart longitudinally of the shaft. The teeth 38 may be secured individually to the respective sleeves 37, as indicated in Fig. 3; or they may be secured thereto in pairs as by clamp plates 39, as illustrated in Fig. 4. The ends of the several comb shafts that extend through the drive plate 30 are each provided with a pinion 40. Mounted on the adjacent end of the tubular drive shaft 29 for relative rotation is a centrally located gear 41, similar to gears 40; and mounted on said drive plate 30 between said gear 41 and each of said pinions 40 on the comb shafts, is an idler gear 42. By this arrangement, as the fluffing reel is rotated, the comb teeth 38 will remain fixed at the same angle to the plane of the ground surface.

Fixed to the central gear 41 on the drive shaft is a laterally extending lever 43 by means of which the angle of the teeth 38 may be readily adjusted as found desirable, as it is obvious that any rotation of the gear 41 with relation to the drive plate 30 will, through the idler gears 42, impart a corresponding rotation to the pinions 40, and therefore to the several comb shafts 35 and the teeth 38 attached thereto. After the desired adjustment is attained, the lever 43 is secured in adjusted position, such as by a bolt or pin 44 adjacent the outer end of said lever adapted to be engaged in one of a series of holes 45 in the frame member 14.

The teeth 38 may be of the usual commercial type and are formed of the usual stout spring wire; but the lower end portion of each tooth is bent rearwardly relative to the forward movement of the tedder, as indicated at 46, which will be forwardly with relation to the rotary movement of the teeth at the lower or hay engaging position, due to the fact that the reel rotates at a greater speed than the forward movement of the tedder. By this arrangement, the ends of the teeth engage more readily and completely under the hay and lift and fluff the same more efficiently.

In order to prevent the teeth from carrying the hay upwardly and over the reel, and permitting the same to become entangled in the device, guard strips 47 are provided. Said strips 47 are secured at the forward ends thereof to the flange 12' of the frame member 12, and curve downwardly and rearwardly under the reel and between the upper portions of the teeth when the teeth are in hay engaging position, and are then curved upwardly and secured to the flange 15' of the frame member 15. By this construction, as the teeth 38 are lowered by rotation of the reel into hay engaging position they extend unhampered between and below the lowermost portions of the guard strips 47, and are free to engage and fluff the hay. As the teeth rise between the rear portions of the strips 47, any hay still adhering thereto will be removed by said strips thereby preventing any hay from becoming deposited or entangled in the device.

A tongue 48 is provided for attaching the fluffer to any suitable means of locomotion, and may be of any desirable length or design.

We claim:

1. A tedder comprising a mobile frame, said frame having supporting wheels, a drive shaft on said frame connected to one of said wheels and driven thereby, a reel mounted on said shaft and having sets of teeth at spaced distances therealong, drive means operatively connected to said reel and to said teeth to rotate said reel and maintain said teeth in a substantially vertical relationship, and guard strips extending substantially circumferentially about said shaft and intermediate certain of said teeth, said strip terminating at the front of said heel at a point substantially level with said shaft and at the rear of said reel at a point substantially level with the top of said reel.

2. The tedder of claim 1 wherein said each of said teeth has a rearwardly bent lower portion in relation to the direction of movement of the tedder, whereby said teeth will more readily and completely engage under hay.

3. The tedder of claim 1 wherein a major portion of each tooth is disposed below said guard strips when the tooth is in a lowermost position, whereby hay carried by said teeth is stripped from said teeth as said teeth move upwardly and rearwardly.

References Cited in the file of this patent

UNITED STATES PATENTS

| | | |
|---|---|---|
| 1,007,676 | Dain | Nov. 7, 1911 |
| 2,336,117 | Moschel et al. | Dec. 7, 1943 |
| 2,771,732 | Schramling | Nov. 27, 1956 |
| 2,810,253 | Moore | Oct. 22, 1957 |